US012792001B2

(12) United States Patent
Honisch et al.

(10) Patent No.: US 12,792,001 B2
(45) Date of Patent: Nov. 10, 2026

(54) METHOD AND DEVICE FOR PROCESS CONTROL OF WORK TASKS BY MEANS OF A TOOL ON AN OBJECT

(71) Applicant: soft2tec GmbH, Ruesselsheim (DE)

(72) Inventors: Frank Honisch, Arnhem (NL); Wolfgang Bruening, Nidderau (DE); Laurent Gilson, Vichten (LU)

(73) Assignee: SOFT2TEC GMBH, Ruesselsheim (DE)

( * ) Notice: Subject to any disclaimer, the term of this patent is extended or adjusted under 35 U.S.C. 154(b) by 295 days.

(21) Appl. No.: 18/766,690

(22) Filed: Jul. 9, 2024

(65) Prior Publication Data

US 2025/0021073 A1 Jan. 16, 2025

(30) Foreign Application Priority Data

Jul. 11, 2023 (DE) ..................... 10 2023 118 299.4

(51) Int. Cl.
*G05B 19/19* (2006.01)
*G01S 17/894* (2020.01)

(52) U.S. Cl.
CPC ............ *G05B 19/19* (2013.01); *G01S 17/894* (2020.01); *G05B 2219/40101* (2013.01)

(58) Field of Classification Search
CPC ...................................................... G05B 19/19
See application file for complete search history.

(56) References Cited

U.S. PATENT DOCUMENTS 3,539,789 A * 11/1970 Fitzner ................. G05B 19/251 341/115
11,815,345 B2 11/2023 Gilson et al.
2002/0038159 A1 3/2002 Gass
(Continued)

FOREIGN PATENT DOCUMENTS

CN 115187556 A 10/2022
DE 19843162 A1 4/2000
(Continued)

OTHER PUBLICATIONS

Zhang, Lunzhao et al.; "Point Cloud Based Three-Dimensional Reconstruction and Identification of Initial Welding Position"; *Transactions on Intelligent Welding Manufacturing*; May 8, 2018; pp. 61-77; Springer Nature Singapore Pte Ltd.; Singapore.

*Primary Examiner* — Suresh Suryawanshi
(74) *Attorney, Agent, or Firm* — LEYDIG, VOIT & MAYER, LTD.

(57) ABSTRACT

A method for process control of work tasks by a tool on an object includes optically determining the position and orientation of the tool over time, for which purpose a marker attached to the tool is captured in an image. The position and orientation of the object is optically determined over time using a sensor that optically captures a scene with the object and tool, each pixel being associated with distance information in the form of a 3D point cloud, and the position and orientation of the object being determined from the pixels and the distance information. It is determined over time, by comparison, when the tool is in a defined 3D work zone, in which case a working position of the tool is signaled, and execution of a work task is enabled, parameterized and/or recorded by a process control system.

12 Claims, 1 Drawing Sheet

(56) References Cited

U.S. PATENT DOCUMENTS

| | | | | |
|---|---|---|---|---|
| 2014/0271074 | A1* | 9/2014 | Ogawa | E02F 9/264 414/687 |
| 2015/0173644 | A1* | 6/2015 | Ren | A61F 9/00736 600/424 |
| 2015/0253766 | A1 | 9/2015 | Pettersson et al. | |
| 2016/0343125 | A1 | 11/2016 | Keitler et al. | |
| 2021/0358110 | A1 | 11/2021 | Bücher et al. | |
| 2022/0016776 | A1 | 1/2022 | Lonsberry et al. | |
| 2023/0269455 | A1 | 8/2023 | Gilson et al. | |

FOREIGN PATENT DOCUMENTS

| | | | | |
|---|---|---|---|---|
| DE | 102013114707 | A1 | 6/2015 | |
| DE | 202018105197 | U1 | 10/2018 | |
| DE | 102018127518 | A1 | 5/2020 | |
| DE | 102019201723 | A1 * | 8/2020 | B23Q 17/249 |
| EP | 2916189 | A1 * | 9/2015 | G05B 19/41805 |
| EP | 3518055 | A1 | 7/2019 | |
| EP | 3529674 | B1 * | 7/2025 | G05B 19/402 |
| WO | WO-02102544 | A1 * | 12/2002 | B23Q 17/002 |
| WO | WO 2021/259523 | A1 | 12/2021 | |
| WO | WO 2022/012899 | A2 | 1/2022 | |

* cited by examiner

METHOD AND DEVICE FOR PROCESS CONTROL OF WORK TASKS BY MEANS OF A TOOL ON AN OBJECT

CROSS REFERENCE TO RELATED APPLICATION

This application claims benefit to German Patent Application No. DE 10 2023 118 299.4, filed on Jul. 11, 2023, which is hereby incorporated by reference herein.

FIELD

The invention relates to a method and a device for process control of work tasks by means of at least one tool on at least one object. The object may preferably be a workpiece such as, for example, a motor vehicle or other products, which are manufactured in particular in a process line in several operations, in which the work tasks are performed. The terms “workpiece” and “object” are used synonymously in this text. The work tasks are to be performed in three-dimensional (3D) work zones defined on the object.

BACKGROUND

As part of the method and system accordance with embodiments of the invention, the position and orientation of the tool, which together can also be referred to as the pose, are optically determined over time by a position detection system in a higher-level coordinate system of the position detection system. In other words, the pose (position and orientation of the tool) is detected in six spatial degrees of freedom. For this purpose, at least one marker of the position detection system, which marker is attached to the tool, is captured in an image by a camera.

Devices and methods for detecting the pose and position of markings in the three-dimensional space include a marking arrangement (marker) with marking units, for example, with light-emitting means (such as infrared diodes) arranged along a line, with at least one optical image capture unit (camera) configured to capture images of the marking arrangement, and an evaluation unit (as part of the position detection system) configured to unambiguously determine the orientation (pose) and the position of the marking arrangement from exactly one image of the optical image capture unit. An example of this is described in WO 2022/012899 A2. In this example, each of the marking units has at least three light-emitting means, which are designed as markings and/or communication elements. At least one of the marking units belongs to a first marking unit type having at least three markings, and at least one other of the marking units belongs to a second marking unit type having exactly two markings and at least one communication element disposed between the two markings (21). At least one of the marking units of the first marking unit type and at least one of the marking units of the second marking unit type are arranged in a non-coplanar manner. Such an arrangement is particularly suitable for unambiguous determination of the orientation and position of the markers, in which process markings of the first marking unit type and of the second marking type are recognized and brought into a relationship with each other. This method can also be used in embodiments of the invention for detecting the position and orientation of the markers.

A similar device is also known from WO 2021/259523 A1. This system is also particularly suitable to be used in embodiments of the invention for detecting the position and orientation of the markers. It includes at least one marking unit (marker) having several markings, an optical image capture unit configured to capture images of the marking unit, and an evaluation unit configured to unambiguously determine the orientation (pose) and the position of the marking unit. The marking unit has at least five markings for pose and position determination and at least one communication element for coding the marking unit. The evaluation unit determines, in the captured image, the orientation and position of the marking unit from the markings and an identity of the marking unit from the at least one communication element.

These and other methods for determining the position and orientation of markers are known to those skilled in the art. In general, all of these known methods can be used in embodiments of the method and system of the present invention.

SUMMARY

In an embodiment, the present disclosure provides a method for process control of work tasks by at least one tool on at least one object, the work tasks having to be performed in three-dimensional (3D) work zones defined on the at least one object. The position and orientation of the at least one tool is optically determined over time by a position detection system in a higher-level coordinate system of the position detection system, for which purpose at least one marker of the position detection system is captured in an image by a camera, the at least one marker being attached to the at least one tool. The position and orientation of the at least one object is optically determined over time by the position detection system, wherein the position detection system includes at least one sensor that optically captures a scene with the at least one object and the at least one tool over time, and each pixel is associated with distance information in a form of a 3D point cloud, the at least one object being recognized and the position and orientation of the at least one object being determined from the pixels and the distance information. The defined 3D work zones on the at least one object are determined in the higher-level coordinate system from the optically determined position and orientation of the at least one object at any one time. It is determined over time, by comparison, when the at least one tool is in one of the defined 3D work zones on the at least one object, in which case a working position of the at least one tool is signaled. Based on the working position of the at least one tool being signaled, execution of one of the work tasks for the at least one object in the respective defined 3D work zone is enabled, parameterized and/or recorded by a process control system

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
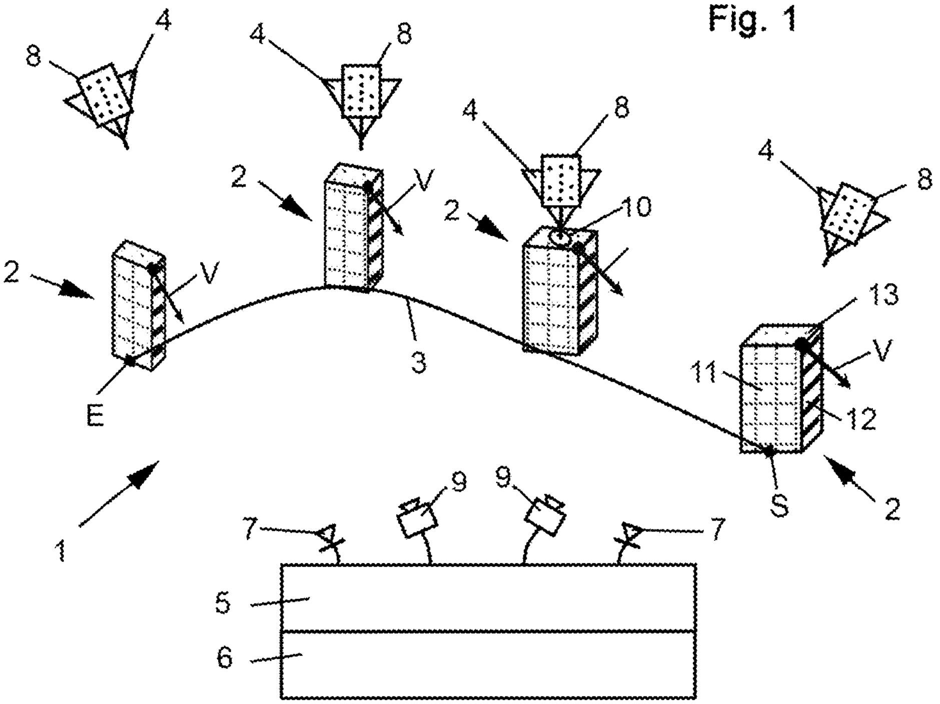
FIG. 1 is a schematic view of an embodiment of the device according to the invention.

According to an embodiment of the invention, the position detection system is designed to optically determine the position and orientation of the object (its pose in six spatial degrees of freedom) over time. This may be done in the higher-level coordinate system of the position detection system or in a separate coordinate system of the sensor used for this purpose in the higher-level coordinate system of the position detection system.

Determining the position and orientation of the tool and object over time means that the position detection system detects movements of the tool and object and at all times knows both the position and orientation of the object and the position and orientation of the tool.

The defined 3D work zones on the object are determined in the higher-level coordinate system from the determined (in the sense of "detected") position and orientation of the object at any one time (i.e., each time the position and orientation of the object are determined over time). This may be done in the position detection system or a downstream process control system, it being possible for the two systems to be combined into one physical unit. By comparison, it is determined over time when the tool is in one of the 3D work zones on the object, in which case a working position of the tool is signaled. This is performed specifically for this particular tool that is to perform the work task in the 3D working position, especially if multiple work tasks controlled by the process control are to be carried out by different tools.

When a working position of the tool has been or is signaled, the execution of the work task for the object in the 3D work zone is enabled, parameterized, and/or recorded by means of a process control system. This process is also referred to as process control.

For this, it is crucial that the system detects where the object (workpiece) is currently located and where the tools are located relative thereto.

In this regard, prior art document DE 20 2018 105 197 U1 describes a system for markerless detection of six degrees of freedom of a workpiece, where the workpiece is moved along a definitely fixed path of movement. A distance-measuring laser is positioned and aligned in the system in such a way that it illuminates a point of the workpiece along the fixed path of movement in each position of the workpiece and measures the distance between the workpiece and the distance-measuring laser by means of a sensor device. After the position and orientation (pose) of the workpiece in space has been detected once by a marker system, as described above by way of example, and the detected position and orientation of the workpiece have been correlated with the distance determined on the fixed path of movement by the distance-measuring laser, the position and orientation of the workpiece can be specified based on the measured distance by measuring the distance with the distance-measuring laser alone. This method works well if the workpiece is moved along an in particular straight, but at least precisely defined path of movement and if the orientation of the workpiece relative to a carrier of the workpiece for movement is defined in a reproducible, precise manner.

However, it is not possible to automatically recognize different workpieces. It has also been difficult to automatically detect when a new workpiece has entered the path of movement monitored by the distance-measuring laser. Moreover, it is often necessary to attach reflectors to the moving workpieces if the laser dot on the object leaves the detection field along the path of movement, e.g. when obstructed from view, when a subsequent workpiece enters the projection area of the laser. The distance-measuring laser is always limited to one object in the detection field. Also, errors can occur when the laser beam is interrupted by objects in the detection field.

In view of the above, embodiments of the invention provide a more robust and more flexible option for process control of work tasks by means of at least one tool on at least one object (workpiece).

This object is achieved by a method having the features of claim 1 and a device having the features of claim 10. It is provided that in the position detection system for determining the position and orientation of the object, there is provided at least one sensor with which a scene with the at least one object and at least one tool is optically captured over time, and each pixel is associated with distance information in the form of a 3D point cloud, the object being recognized and the position and orientation of the object being determined from the pixels and the distance information.

The sensor may preferably be a LIDAR sensor or a TOF sensor. LIDAR stands for "Light Detection And Ranging" and is a distance measurement method related to radar. The LIDAR sensors typically emit laser pulses and detect the light that is scattered back. TOF stands for "Time-of-Flight" and stands for 3D camera systems which measure distances using the time-of-flight method. To this end, the scene being viewed is illuminated by a light pulse, and the camera measures the time-of-flight of the light to and back from the object for each pixel. In contrast to a laser scanner, as is often used with LIDAR sensors, TOF sensors have the advantage of capturing the entire scene at once. The illumination can be LEDs or laser diodes in the visible or infrared wavelength range. Thus, the system is also easier to integrate into production lines than the systems known from the prior art, because it is only necessary to install the sensors that are needed to create a complete 3D point cloud of the scene with the objects, in which 3D point cloud the objects can be uniquely identified and their position can be determined. This eliminates the need for complex installation of distance-measuring devices and attachment of reflectors and/or positionally accurate attachment of markers.

It is, therefore, possible according to embodiments of the invention to identify the objects without having to externally specify which object should be tracked. Identification can already be done with a few characteristic points recorded during the initial movement of the workpiece, without determining the exact position and orientation, and without the object having to be entirely visible. The identification of the object in the position detection and process control system may be used to activate a zone control that is responsible for the identified workpiece variant. Otherwise, further processing of the data may be aborted by the process control system if the recognized object does not have to be worked on in this working area or portion of the working area.

The sensors proposed according to embodiments of the invention make it possible to define, in the 3D point cloud, movement channels or regions in the working area (and correspondingly in the sensing field) in which the data needed to calculate at least one unique measurement value that identifies the object and describes the actual position and orientation of the object (positioning signal) is filtered. By capturing the 3D point cloud using the sensor according to embodiments of the invention, a more robust positioning signal can be generated, due to many parallel measurement points, than in a case where only one measurement point is available, such as in the case of the distance-measuring laser according to the prior art. In addition, all pixels (together with the associated distance information) of the 3D point cloud can be evaluated in parallel, so that several objects in the working area can be recognized simultaneously and taken into account by process control.

In accordance with a preferred embodiment, a plurality of (planar or curved) surfaces can be recognized in the 3D point cloud and brought into a relationship with each other in order to recognize the object and determine the position and orientation of the object over time. In other words, the object is identified by the surfaces that are recognized in the image through image analysis and which are in a defined relationship with each other. Thus, by identifying the object in each image, it is also possible to describe the path of movement of the object over time (i.e., in images captured at different times). Surface recognition can be limited to the movement channels (regions in the working area) that describe the actual working area of the object.

In accordance with an embodiment of the invention, different objects can be automatically recognized and identified by bringing different characteristic surfaces into a relationship with each other for purposes of description.

In a refinement of this embodiment, boundaries of the surfaces of the object can be recognized by edges at which the orientation of the surface changes, and/or by changes in brightness in the image. In this context, edges are changes in the surface where an abrupt (non-continuous) transition from a first to a second orientation of the surface occurs. In optical camera images, such edges usually appear as lines and/or abrupt changes in contrast, which can be optically recognized in a two-dimensional image using conventional image recognition methods. Due to the additional distance information in the 3D point cloud, edges can also be recognized by a sharp change in the distance between pixels in a neighborhood area of the pixels (or, in other words, a change in a distance gradient between pixels in the neighborhood area).

Changes in brightness in the image between pixels in a neighborhood area can occur with different orientations of the surfaces because the directions of reflection of the light change. However, significant changes in brightness may also occur if the surfaces differ in nature (type of material of the surface, different surface properties), even if there is no change in the orientation of the surfaces. This is due to different reflection properties of different materials.

An important advantage of using the sensors according to embodiments of the invention, in particular LIDAR and/or TOF sensors, is that optical information (brightness of the pixel) indicative of the nature of the surface is coupled with distance information (indicative of the distance of the object from the sensor in the pixel). Thus, information about the pose and orientation of the object can be obtained directly from the pixel data in which the object is recognized, without the need to perform complex calculations, such as triangulations, to have knowledge about the design data of the object, and/or to use and laboriously calibrate stereo camera systems.

In addition, the sensors used according to embodiments of the invention, in particular LIDAR and/or TOF sensors, themselves emit the light that is used for detection after reflection. Thus, in contrast to purely optical imaging using ambient light, the detection method of these sensors is also independent of the ambient light. Preferably, the spectrum of light is known, so that wavelength-selective filtering can be performed during detection in order to minimize noise from ambient light. In accordance with an embodiment, if the light used has a red, a yellow, and a blue component, color information of the surfaces can also be used in the determination of the surfaces of the object. If the light used has a filterable infrared component, distance information can be obtained independently of light components in the visible wavelength range, which makes it possible to further reduce background noise. A combination of the aforementioned options is also possible.

Overall, the object can be characterized by many different features and thus be recognized with very high accuracy using the sensors according to embodiments of the invention. Accordingly, its position and orientation can be described very precisely. This also makes it possible to detect and determine the pose (position and orientation) of the object when parts of the object are occluded in a scene (e.g., by a worker handling and operating the tool to perform a work task) and not shown in the image. This makes the inventive method very robust as compared to solutions known from the prior art.

In a simple embodiment, the recognized surfaces of the object can be mathematically described by flat planes with straight edges; the orientation of the planes being described, for example, by a normal vector perpendicular to the plane. Thus, relationships between the recognized surfaces of the object can be readily established mathematically. In a more complex solution, the surfaces may also be described by fitting of geometric shapes, it being possible to use the pose and orientation of the geometric figures, together with the fitted parameters for describing the figures, to describe the relationships between the surfaces. This also makes it possible to describe non-planar surfaces and/or non-straight edges. In this regard, although the embodiments described above provide easy-to-implement and robust ways of recognizing and describing the objects, the invention is not limited thereto.

In another preferred embodiment, the position and orientation of the object can be described by a vector that always acts at the same position of the object. This position can be determined automatically by the image recognition (software) in the position detection system or the process control system.

According to an embodiment of the invention, a movement of the object relative to the position detection system can be determined from the change in position and/or orientation of the object over time (e.g., by determining a direction of movement and/or a speed of movement). It is thus also possible to check in a process control whether certain work tasks are performed in a planned process section or (portion of the) working area and whether all work tasks to be carried out can still be reached in the process section if the object continues to move uniformly. This can be used for flexible control of the movement of the object in the process line, which can be precisely controlled in such a way that the intended work tasks are performed exactly in the process section or (portion of the) working area (making full use of the length of the intended process section or (portion of the) working area). This dynamically optimizes the use of available resources and is very robust because problems arising in the process can be dynamically taken into account. In the event of a signal loss, known motion information of the object can also be used to predict probable future positions.

According to an embodiment of the invention, particularly simple commissioning and parameterization can be achieved if the 3D work zones defined on the object are determined by gauging the object using a method in which 3D point clouds of the object are captured by means of the at least one sensor of the position detection system, and a plurality of (planar or curved) surfaces are recognized and identified as surfaces of the object (e.g., by manual selection or by defining an image region that shows the at least one object). The surfaces identified as surfaces of the object are brought into a relationship with each other to uniquely describe the object. During gauging, one or more additional markers of the position detection system are attached to the object. The position and orientation of the marker on the object are thus also detectable by the camera of the position detection system, such as are the markers on the tools. To mark the 3D work zones on the object, the tool with the marker attached thereto and/or a position tracker with a marker attached thereto are/is moved to a (or successively to each) work point work for a work task on the object, Then, the 3D point cloud is captured by the at least one sensor synchronously with the capture of an image of the markers of the object and of the tool and/or of the position tracker, in which process (a) the position and orientation of the object from the 3D point cloud, and (b) the position and orientation of the marker of the tool, and/or of the position tracker from the image of the camera are correlated with one another via the position and orientation of the marker of the object. This defines the 3D work zones around the work zones of the object (it being possible to define a tolerance range for the 3D work zones).

This correlation makes it possible to define the 3D work zones in relation to the pose and orientation of the object in the higher-level coordinate system without having to explicitly determine the position and orientation of the object in space (by indicating specific coordinates) in the higher-level coordinate system. By means of the correlation via the marker on the object during gauging, the pose and orientation of the object, captured in the 3D point cloud and described, for example, by a vector on the object, are transferred into the higher-level coordinate system in the sense that the position and orientation of markers, as attached to the position tracker and/or the tools, are known relative to the pose and orientation of the object. In this way, the 3D working positions can be described in the higher-level coordinate system of the trackers. Thus, as a result of this correlation, the position and orientation of the object are also optically determined in the higher-level coordinate system of the position detection system, but without explicitly describing coordinates of the pose and orientation of the object in the coordinate system. This constitutes a preferred embodiment of the invention, because the parameterization and teach-in of objects are particularly easy. This solution does not require explicit calibration of the coordinate system of the sensor to the higher-level coordinate system in which the markers are described.

However, the invention is not limited to this particularly preferred solution. In accordance with an embodiment of the invention, it is also possible to explicitly calibrate the coordinate system of the sensor and the higher-level coordinate system of the markers to each other and to describe the position and orientation of the object (indicating the coordinates) in this higher-level coordinate system. A person of ordinary skill in the art is knowledgeable about how to perform such a calibration. However, this is associated with considerable effort during set-up of the system and, generally, a recalibration must be regularly carried out during operation, i.e. during the execution of the process control method.

Another advantage of the advantageous teach-in method described in this embodiment is that the design data of the object is not known or does not need to be known. The 3D work zones are taught-in simply by marking the work points with the tool and/or the position tracker (and the markers attached thereto), which is referred to as "teach-in procedure."

Thus, as soon as the position and orientation of the object are determined in the higher-level coordinate system (preferably by the correlation described above), the 3D work zones are also known relative to the position and orientation of the object, and the actual process control of the work tasks can be performed.

Due to the determination of the position and orientation of the object as proposed in accordance with embodiments of the invention, which is parameterized by simply imaging the object via the sensors and teaching-in the 3D work zones, without the need to know further details about the object (3D design data) or a path of movement of the object during the execution of the work tasks relative to the higher-level coordinate system or the position detection system, respectively, the system is quickly configured and flexible to use in practice, for example if the position of the object in production is not always the same and different objects are processed in the process line. After one or each different object that is processed in the production line has been taught-in, the object can be easily recognized in the production line, and its position and pose can be easily and reliably determined and used in process control.

In a particularly preferred embodiment of the proposed method, during gauging, the object is moved from a start point to an end point of a working area of the object and recorded across the working area by the sensor, in each case determining the position and orientation. Preferably, the position and orientation of the object are stored along with the associated relationship of the recognized surfaces, so that reference data of the object is available for different positions of the object in the working area. Thus, data from the at least one sensor is available as a 3D point cloud for each work location in the working area of the object. This facilitates locating the objects when operations are carried out during process control and also facilitates the detection of the orientation of the object.

According to an embodiment of the invention, gauging of the path of movement of the object makes it also possible to detect deviations from the position and pose of the object during operation, in particular during the execution of the method after the gauging process. According to an embodiment of the invention, this can be used to check during process control whether a predetermined motion sequence of the object is adhered to, for example by defining tolerances for the position and orientation during the gauging process. Since, in accordance with an embodiment of the invention, the 3D work zones on the object for performing work tasks using the tool were correlated with the position and orientation of the object during the gauging process (in other words, are defined in an object coordinate system), the current pose and position are automatically adapted to the data in the 3D point cloud. The 3D work zones on the object are thus known in the higher-level coordinate system relative to the object and are automatically taken into account by the process control with respect to the position and orientation of the tools.

In this embodiment, the start and end points of the object in the working area can be defined accordingly when gauging the object over the path of movement from the start point to the end point. In accordance with an embodiment of the invention, these start and end points for the objects can be specifically monitored (special movement channels) during the execution of the method (after the gauging process) in the sense that in each image, each start point and each end point of an object is examined as to whether an object correlated with the position as the start or end point can be identified at this position. At a start point, the process control for the object is activated, and an end point, the process control for the object is deactivated.

In accordance with a particularly preferred embodiment, it is provided that the scene with the at least one object and the at least one tool is captured by a plurality of sensors (and possibly also cameras) from different directions. The data from the various sensors can be merged, because partially redundant data is then available in the 3D point cloud and can be correlated. This allows for an even more robust detection of the pose of the object, even if portions of the object in the sensing field of one or more sensors are occluded. Workers (who handle and operate tools to carry out work tasks) often occlude portions of the object when their body comes between the sensor and the object. The availability of redundant data makes it possible to recognize surfaces on the object and bring them into a relationship with each other without the entire recognized area being captured by a sensor.

In other words, 3D point clouds from several sensors can be fused to extend the range of movement and, for example, to monitor the entire working area from at least one viewing direction, preferably from several viewing directions. The 3D point clouds can be registered to each other and represent the desired range of movement. Thus, in situations where an object is only partially visible, the object can be localized more precisely in a plurality of sensors than would be possible with just one sensor.

In principle, each sensor can at least initially form its own coordinate system with the captured 3D point cloud (in particular during the teach-in procedure), so that a plurality of different coordinate systems exist. These can be merged by the position detection system or the process control system into exactly one higher-level coordinate system of the position detection and process control system, preferably by the above-described correlation.

However, it is also possible that the process control system always works with additional coordinate systems of the various sensors and selects one of the coordinate systems (and respectively one of the sensors) for the execution of a work task in the course of process control.

Similarly, for purposes of detecting the position of the tools, a plurality of cameras may be provided to capture the scene. In accordance with an embodiment of the invention, the images of the cameras and of the sensors are preferably synchronized with each other, so that the position of the objects and the position of the tools are respectively known at the same time.

During the execution of the process control method according to an embodiment of the invention, a plurality of objects and/or tools may be simultaneously located in the working area, and a plurality of work tasks may be carried out in parallel, independently of each other. In particular, different types of objects can be simultaneously detected and handled by the process control (provided that each of the objects was taught-in once as described). The objects and tools that are simultaneously captured in a scene and handled by the process control may each perform their own movements in different directions and/or at different speeds. Consequently, the distance between the various objects in the monitored range of movement may vary and be different at different measurement times.

This is a great advantage of monitoring the scene with cameras that can determine from the images of specially configured markers (as described) the pose and position of the markers (in a known manner), and with sensors that generate a 3D point cloud of pixels and distance information of the entire sensing field. This allows the data to be evaluated quickly and efficiently, even simultaneously for a plurality of objects and tools.

Moving objects may be objects that are moved relative to a stationary working environment. It is also possible that the working environment (tools and workers) move past an object that is stationary or moved with another movement. This is the case, for example, when a rail system is used on which a tool (e.g., a screwdriver with a torque arm) is moved. This is often used when a tool is used on different vehicles in parallel in an assembly line production. In this case, the assembly line moves with the tool, and the worker can perform finishing work in a working area (e.g., of several meters in length) along the line.

The position detection system including the cameras and sensors may be disposed in a stationary system or in a moving system and preferably detects at least one object moved relative to the position detection system and/or a working environment moved relative to the position detection system. In a typical application, the position detection system and the working environment are in a common system (i.e., stationary relative to each other) and an object system moves relative thereto.

In principle, the method can also be used when both the object and the position detection/process control system are moved or movable at different speeds and/or on different paths of movement relative to a space-fixed system.

A particularly preferred evaluation of the 3D point clouds and of the images of the cameras (hereinafter also referred to simply as “data”) according to an embodiment of the invention uses Artificial Intelligence (AI) methods to recognize the surfaces, to associate the 3D work zones, and/or to link the position and orientation of the object from the 3D point cloud and the marker of the object, and accesses 3D point clouds which are captured by the at least one sensor over time. This may include, in particular, the data recorded during the teach-in procedure and the data collected over time during operation. In this way, continuous updating of the position detection system and of the process control system is obtained, which also adapts to changed work procedures, for example. According to an embodiment of the invention, it is also possible that, in addition to the objects, the position of the workers during the execution of the work tasks is also evaluated, for example, during quality control and assessment of the work procedures.

An embodiment of the invention provides a device for process control of work tasks by means of at least one tool on at least one object. The device has a position detection system for determining the position and orientation of the tool, the position detection system including at least one marker which is attachable (or attached) to the tool, a camera configured to capture an image of the marker, and at least one sensor for determining the position and orientation of the object. Further, a process control system is provided for enabling, parameterizing, and/or recording the execution of the work task for the object. A computing unit of the position detection and process control system is equipped with at least one processor (e.g., a common processor of the position detection and process control system) suitably configured for controlling the position detection and process control system (including the components thereof, such as, in particular, cameras and sensors). The at least one sensor is configured to capture a scene with the at least one object and the at least one tool as a 3D point cloud of pixels, each pixel being associated with distance information. The at least one processor is configured for performing the method according to any of claims 1 through 9 or parts thereof.

The position detection and process control system is regarded and described as a logical unit, regardless of whether in reality they are implemented in one physical computing unit or in a plurality of physical computing units which, as a group of processors in communication with one another, exchange data and perform individual process steps in one and/or another computing unit. Those skilled in the art can readily realize the distribution of certain process steps among different physical computing units, or implement the position detection and process control system in a computing unit, with one or a plurality of processors each.

According to a preferred embodiment, the at least one sensor is a LIDAR sensor or a TOF sensor. It is also possible that a device according to an embodiment of the invention has a plurality of sensors, where a portion of the sensors may be in the form of LIDAR sensors and another portion of the sensors in the form of TOF sensors.

Further advantages, features, and possible applications of embodiments of the invention will also be apparent from the following description of exemplary embodiments and the figures. All described and/or graphically depicted features belong together or in any technically reasonable combination to the subject matter of embodiments of the invention, also independently of their combination in described or depicted exemplary embodiments.

In FIG. 1, an embodiment of an inventive device 1 for process control of work tasks on an object 2, also referred to as workpiece, is schematically shown in simplified form for the sake of clarity. In the example shown here, object 2 is moved from a start point S to an end point E on a path of movement 3 through a working area during processing. The speed of movement is variable. The work tasks are performed by means of a tool 4, which is handled and operated by a worker, for example.

Workpiece 2 may also be stopped in its movement. This is detected by the system according to an embodiment of the invention without the need to reinitialize the process control. For this purpose, the device 1 monitoring the working area has a position detection system 5 and, in particular downstream thereof, a process control system 6, here illustrated as a common computing unit having processors configured to control the device and carry out the inventive method.

In the example shown here, two cameras 7 are connected to position detection system 5, which capture the entire scene from different viewing directions. In a real application, typically more cameras 7 are provided, which redundantly capture images of the entire scene from different viewing directions. The position detection system determines from the images of cameras 7 the position and orientation of tool 4 in a higher-level coordinate system over time, i.e., while workpiece 2 moves along path of movement 3. To this end, at least one of the cameras 7 captures the image of the tools 4 to which markers 8 having markings are attached. As explained at the outset and known to those skilled in the art from the prior art, position detection system 5 is configured to determine the position and orientation of tools 4 from the image of cameras 7 based on markers 8.

Also connected to position detection system 5 are sensors 9 (in the example shown here, two sensors 9) which capture the entire scene from different viewing directions. In a real application, typically more sensor are provided, which redundantly capture the entire scene from different viewing directions. Sensors 9 are LIDAR sensors or TOF sensors or comparable sensors 9 with which a scene with the object 2 and the at least one tool 4 is optically captured over time, and each pixel is associated with distance information in the form of a 3D point cloud, the object 2 being recognized and the position and orientation of the object being determined from the pixels and the distance information.

Figure 2:
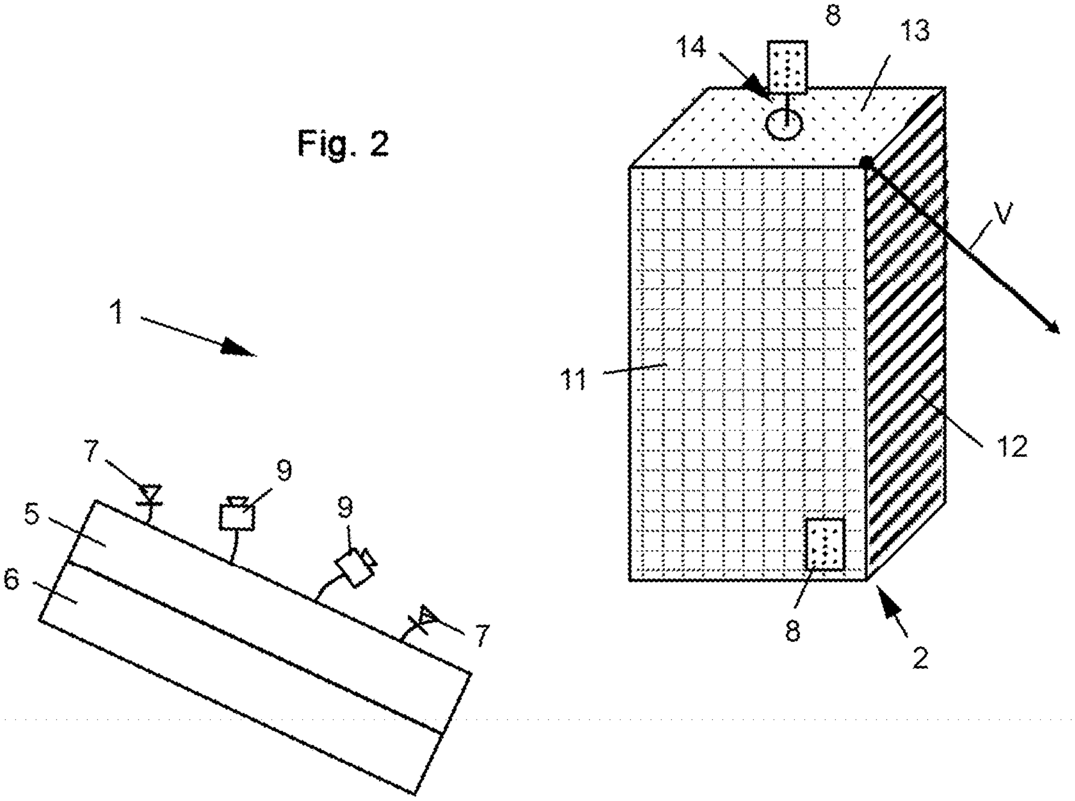
FIG. 2 is a schematic view showing a portion of the device of FIG. 1 during gauging of the object.

A comparison is performed (e.g., in position detection system 5 or process control system 6) to determine over time when tool 4 is located in one of the 3D work zones 10 on object 2 (specifically for this tool 4). In this case, a working position of tool 4 is signaled. With reference to FIG. 2, it will later be described how the 3D working positions on an object 2 are determined in the higher-level coordinate system, in which the position and orientation of the tools are described as well. The higher-level coordinate system of position detection system 5 is used to precisely determine the position and pose of tools 4, people, body parts of people (e.g., hands, arms, head), or of other parts to which markers 8 are affixed. Position detection system 5 is able to very accurately detect movements of one or more tools 4 (and, respectively, of markers 8) in space in six degrees of freedom (position and orientation).

When a working position of tool 4 is signaled, the execution of the work task for object 2 in 3D work zone 10 is enabled, parameterized, and/or recorded by means of process control system 6. The worker can then perform the work task on workpiece 2 in this 3D work zone 10 using tool 4, it being possible that parameters of the tool may be set or that the execution of the operation may be recorded for quality assurance purposes. This is an exemplary object of the process control.

In a specific example, tools 4 may be screwdrivers or drilling machines. The work operations on workpiece 2 (object) are to be carried out in defined 3D work zones 10 on workpiece 2. 3D work zones 10 can be very small; e.g., spherical zones having a radius of 1 cm may have to be monitored. Minute spatial zones can be unambiguously recognized throughout the path of movement of workpiece 2, although the overall working area may have a length of several meters. In the automotive industry, the path along which workpiece 2 (vehicle) is processed is often 7 m.

Screws are often attached to the workpiece 2 in non-visible positions and can only be reached using extensions for the screwdriver bit (part of tool 4), as the screws are located down in a hole. One or more hand-held screwdrivers (tool 4) are clearly detected in terms of position and pose in space by position detection system 5. Position detection system 5 calculates, for example, the position of the screwdriver bit in space via a vector to the screwdriver tip (part of tool 4) and signals the information whether the position of the screwdriver bit of a screwdriver (tool 4) reaches a 3D work zone 10 on workpiece 2 back to process control system 6. The process control can use this information to individually parameterize the screwdriver (tool 4) for the following screwdriving operation in the zone, and to enable the screwdriving operation in this position. The previously disabled screwdriver is now enabled and the operator can perform the screwdriving operation specifically in this position.

Workpiece 2 and a carrier of workpiece 2 are not provided with markers 8 during the execution of the method. This is advantageous because the process of retrofitting markers 8 on each of the workpieces is costly and labor-intensive. Markers 8 must be precisely manufactured and be classifiable. In addition, precise attachment points must be found on the workpiece or, respectively, on object 2 and be attached to object 2 by means of calibration procedures or placed by a worker at precise positions on each incoming workpiece. The 3D design data of workpiece 2 is also not required and, accordingly, is not known at least to position detection system 5 and process control system 6 in typical applications.

With the system (device and method according to embodiments of the invention), it is possible to precisely localize at any time of the paths of movement of object 2, i.e., 3D work zones 10, on one or more objects 10 (workpieces). 3D work zones 10 may be, for example, mounting zones for screwing, drilling, reaming, rolling, gluing, greasing, snap-in mounting, push-in mounting, which do not move synchronously with tools 4. One or more tools 4 in different positions than in other movements of one or more workers are unambiguously recognized and associated with one another.

FIG. 2 shows a portion of the device 1 of FIG. 1 with position detection system 5, including cameras 7 and sensors 9, and with process control system 6.

An (as yet unknown) object 2 is located in the detection field of position detection system 5 and is to be taught into the system by gauging (teaching-in). To this end, object 2 is captured in the form of 3D point clouds by means of sensor 9 of position detection system 5. If object 2 is captured by a plurality of sensors 9, the plurality of 3D point clouds can be registered to each other, producing a common 3D point cloud (in the sense of a common 3D space).

In an image region showing object 2 (recognized, for example, manually or automatically by image recognition software), a plurality of (planar or curved) surfaces 11, 12, 13 are recognized (represented by different textures in the drawing) and identified as surfaces 11, 12, 13 of the object. The surfaces 11, 12, 13 that are identified as surfaces 11, 12, 13 of object 2 are brought into a relationship with each other to describe object 2. The description of object 2 may be represented, for example, as a position and orientation vector V of object 2, which is derived from the relationship of the identifiable surfaces 11, 12, 13.

Specifically, the following steps may be performed in the example shown. Filtered 3D data channels from the 3D point cloud, which form or describe surfaces 11, 12, 13 in space, are mathematically converted to edges. The edges are described by straight lines with start and stop locations in the 3D space and brought into a relationship with each other. A sum of the orientation of the calculated surfaces 11, 12, 13 in space generates a characteristic value which can be represented as a position and orientation vector V of object 2 in space and which acts at a specific position of object 2 (preferably determined by the evaluation program), for example the point of intersection of certain ones of the identified surfaces 11, 12, 13. Other methods for determining a characteristic value are also possible, as described at the outset.

The change in the characteristic value (e.g., of vector V) can be used in all described embodiments of the invention to determine a speed of movement and a direction of movement of object 2. A linear incremental value may be defined for the case that, in the event of a signal loss, an interpolation of the movement along the acquired data signal is assumed, which can also be used in all described embodiments of the invention.

In addition, at least one marker 8 of position detection system 5 is attached to object 2. In this connection, one or more markers 8 define a coordinate system on object 2 (workpiece) that corresponds to the higher-level coordinate system.

Furthermore, tool 4 with marker 8 and/or—as shown in the embodiment of FIG. 2—a position tracker 14 with a marker 8 are/is moved to a work point of object 2 for a work task. The 3D point cloud is then captured by sensor 2 and, synchronously therewith, an image of markers 8 of object 2 and of tool 4 and/or of position tracker 14 are captured by the camera 7, and the position and orientation of object 2 (described, for example, by position and orientation vector V) and the position and orientation of the marker of tool 4 and/or of position tracker 14 are correlated with one another via the position and orientation of marker 8 on object 2 to define the one or more 3D work zones 10 of object 2. In this way, the position of 3D work zones 10 of object 2 becomes known in the higher-level coordinate system, without the position and orientation vector V of object 2 (or, more generally, its position and orientation) having to be quantitatively known in the higher-level coordinate system.

When applying the teach-in procedure in the manner described, each product variant must be taught-in once. Furthermore, it is advantageous to move a workpiece 2 through the working area along path of movement 3 during gauging in order to facilitate and speed up the identification of workpiece 2 during use of the process control method. The speed of movement is not relevant in this connection. An imaging process may also be stopped or interrupted, for example. It is also possible to move a plurality of workpieces 2 in parallel in the working area. The data of the individual workpieces 2 may be extracted and used for training purposes (e.g., using AI methods) to obtain more robust results through redundant acquisition. In this way, it is additionally or alternatively also possible to teach-in a plurality of product variants in at the same time.

The device 1 illustratively described here may be configured to perform all the method steps described in the application and may additionally have further components, which are not shown in the drawing for reasons of clarity.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 device for process control of work tasks on an object
2 object (workpiece)

3 path of movement
4 tool
5 position detection system
6 process control system
7 camera
8 marker with markings
9 sensor
10 3D work zone
11 surface of the object
12 surface of the object
13 surface of the object
14 position tracker
S start point of the object on the path of movement
E end point of the object on the path of movement
V position and orientation vector of the object

The invention claimed is:

1. A method for process control of work tasks by at least one tool on at least one object, the work tasks having to be performed in three-dimensional (3D) work zones defined on the at least one object, the method comprising:

optically determining a position and orientation of the at least one tool over time by a position detection system in a higher-level coordinate system of the position detection system, for which purpose at least one marker of the position detection system is captured in an image by a camera, the at least one marker being attached to the at least one tool;

optically determining a position and orientation of the at least one object over time by the position detection system, wherein the position detection system includes at least one sensor that optically captures a scene with the at least one object and the at least one tool over time, and each pixel is associated with distance information in a form of a 3D point cloud, the at least one object being recognized and the position and orientation of the at least one object being determined from the pixels and the distance information;

determining the defined 3D work zones on the at least one object in the higher-level coordinate system from the optically determined position and orientation of the at least one object at any one time;

determining over time, by comparison, when the at least one tool is in one of the defined 3D work zones on the at least one object, in which case a working position of the at least one tool is signaled; and based on the working position of the at least one tool is being signaled, enabling, parameterizing and/or recording, by a process control system, execution of one of the work tasks for the at least one object in the respective defined 3D work zone.

2. The method as recited in claim 1, wherein a plurality of surfaces are recognized in the 3D point clouds and brought into a relationship with each other in order to recognize the at least one object and determine the position and orientation of the at least one object over time.

3. The method as recited in claim 2, wherein boundaries of the surfaces of the at least one object are recognized by edges at which the orientation of the surface changes, and/or by changes in brightness in the image.

4. The method as recited in claim 2, wherein a movement of the at least one object relative to the position detection system is determined from a change in the position and/or orientation of the at least one object over time.

5. The method as recited in claim 1, wherein the defined 3D work zones are determined by gauging the at least one object, during which:

the at least one sensor of the position detection system captures 3D point clouds of the at least one object, and a plurality of surfaces are recognized and identified as surfaces of the at least one object;

the surfaces that are identified as surfaces of the at least one object are brought into a relationship with each other to describe the at least one object;

at least one marker of the position detection system is attached to the at least one object; and the at least one tool with the at least one marker and/or a position tracker with a marker are/is moved to a work point for one of the work tasks, and one of the 3D point clouds and an image of the at least one marker of the at least one object and of the at least one tool and/or of the position tracker are captured synchronously, in which process the position and orientation of the at least one object and the position and orientation of the at least one marker of the at least one tool and/or of the position tracker are correlated with one another via the position and orientation of the at least one marker of the at least one object to define the 3D work zones.

6. The method as recited in claim 5, wherein during the gauging, the at least one object is moved from a start point to an end point of a working area of the at least one object and recorded across the working area by the at least one sensor, and the position and orientation are determined in each case.

7. The method as recited in claim 1, wherein the scene with the at least one object and the at least one tool is captured by a plurality of sensors from different directions.

8. The method as recited in claim 1, wherein during process control, a plurality of objects and/or tools are simultaneously located in a working area, and a plurality of work tasks are carried out in parallel, independently of each other.

9. The method as recited in claim 1, wherein the 3D point clouds and of the images of the cameras uses are evaluated using Artificial Intelligence (AI) methods to recognize the surfaces, to associate the 3D work zones, and/or to link the position and orientation of the at least one object from the 3D point clouds and the at least one marker of the at least one object, and to access the 3D point clouds which are captured by the at least one sensor over time.

10. A device for process control of work tasks by at least one tool on at least one object, the device comprising:

a position detection system configured to determine a position and orientation of the at least one tool, the position detection system including at least one marker which is attachable to the at least one tool, a camera configured to capture an image of the at least one marker, and at least one sensor configured to determine position and orientation of the at least one object, the at least one sensor being configured to capture a scene with the at least one object and the at least one tool as a 3D point cloud of pixels, each pixel being associated with distance information;

a process control system configured to enable, parameterize, and/or record execution of the work tasks for the at least one object;

a computing unit of the position detection and process control systems with at least one processor for controlling the position detection and process control systems, the at least one processor is configured for performing the method according to claim 1.

11. The device as recited in claim 10, wherein the at least one sensor is a Light Detection And Ranging (LIDAR) sensor or a Time-of-Flight (TOF) sensor.

12. The method as recited in claim 1, wherein the at least one sensor is a Light Detection And Ranging (LIDAR) or a Time-of-Flight (TOF) sensor.

* * * * *